United States Patent [19]

Shah et al.

[11] Patent Number: 5,461,723
[45] Date of Patent: Oct. 24, 1995

[54] DUAL CHANNEL DATA BLOCK TRANSFER BUS

[75] Inventors: Kaushik S. Shah, Santa Clara; Joseph S. Glider, Palo Alto; Edward E. Asato, Sunnyvale; Hoke S. Johnson, III, Monte Sereno; Duc H. Trang, San Jose, all of Calif.

[73] Assignee: MIT Technology Corp., Anaheim, Calif.

[21] Appl. No.: 134,514

[22] Filed: Oct. 8, 1993

Related U.S. Application Data

[63] Continuation of Ser. No. 505,296, Apr. 5, 1990, abandoned.

[51] Int. Cl.[6] ................................................ G06F 13/18
[52] U.S. Cl. .................... 395/293; 395/894; 395/307; 395/441; 364/238.4; 364/239.1; 364/244.8; 364/284.1
[58] Field of Search ................................ 395/325, 200, 395/800, 550

[56] References Cited

U.S. PATENT DOCUMENTS

| | | |
|---|---|---|
| 4,467,421 | 8/1984 | White . |
| 4,468,731 | 8/1984 | Johnson et al. . |

(List continued on next page.)

FOREIGN PATENT DOCUMENTS

| | | |
|---|---|---|
| 266789 | of 0000 | European Pat. Off. . |
| 369707 | of 0000 | European Pat. Off. . |
| 56-83400 | of 0000 | Japan . |
| 57-111893 | of 0000 | Japan . |
| 57-111890 | of 0000 | Japan . |
| 56-94593 | of 0000 | Japan . |
| 56-163596 | of 0000 | Japan . |
| 56-88549 | of 0000 | Japan . |
| 57-195397 | of 0000 | Japan . |
| 57-169297 | of 0000 | Japan . |
| 60-156152 | of 0000 | Japan . |
| 61-99999 | of 0000 | Japan . |
| 1233087 | of 0000 | United Kingdom . |
| 1497680 | of 0000 | United Kingdom . |

OTHER PUBLICATIONS

Blum, "Fast Access Disk File with Several Parallel Heads", IBM Technical Disclosure Bulletin, vol. 25, No. 6, Nov. 1982.

W. Jilke, "Disk Array Mass Storage Systems: The New Opportunity," Amperif Corporation, Sep. 30, 1986.

W. Jilke, "Economics Study of Disk Array Mass Storage Systems: The Cost Reduction Opportunity," Amperif Corporation, Mar. 24, 1987.

Michelle Y. Kim, "Synchronized Disk Interleaving," IEEE Transactions on Computers, vol. C–35 No. 11, Nov. 1986.

D. Lieberman, "SCSI–2 Controller Board Builds Parallel Disk Drive Arrays," Computer Design, vol. 28, No. 7, Apr. 1, 1989, pp. 32, 36.

W. Meador, "Disk Array Systems," Spring COMPCON 89 Digest of Papers, IEEE Computer Society Press, pp. 143–146.

T. Olson, "Disk array Performance in a Random IO Environment," Computer Architecture, vol. 17, No. 5, Sep. 1989, pp. 71–77.

(List continued on next page.)

*Primary Examiner*—Allen R. MacDonald
*Assistant Examiner*—Tariq Hafiz
*Attorney, Agent, or Firm*—Townsend and Townsend Khourie and Crew

[57] ABSTRACT

A block transfer data bus having two separate paths, with each element coupled to the bus having the ability to arbitrate for use of one or the other or both of the bus halves. Each bus half includes an address/data bus portion for sending/receiving the data and addresses. A separate control bus portion for each bus half provides certain status signals and a code indicating the type of data on the address/data bus. An arbitration bus provides data request signals from each element to a central arbiter. In addition, a separate grant signal associated with each bus half is provided back to each element from the arbiter along the arbitration bus. A line on each control signal bus indicates whether or not the bus half is busy.

2 Claims, 21 Drawing Sheets

U.S. PATENT DOCUMENTS

| | | | |
|---|---|---|---|
| 4,490,785 | 12/1984 | Strecker et al. | 364/200 |
| 4,507,730 | 3/1985 | Johnson et al. | |
| 4,597,084 | 6/1986 | Dynneson et al. | 371/51 |
| 4,695,952 | 9/1987 | Howland | 395/325 |
| 4,760,525 | 7/1988 | Webb | 395/800 |
| 4,787,033 | 11/1988 | Bomba et al. | 395/325 |
| 4,881,205 | 11/1989 | Aihara | 365/222 |
| 4,893,271 | 1/1990 | Davis et al. | 395/750 |
| 4,967,344 | 10/1990 | Scavezze et al. | 364/200 |
| 4,979,097 | 12/1990 | Triolo et al. | 395/200 |
| 5,038,276 | 8/1991 | Bozzetti et al. | 395/325 |
| 5,062,041 | 10/1991 | Zuk | 364/200 |
| 5,079,696 | 1/1992 | Priem et al. | 395/550 |
| 5,083,266 | 6/1992 | Watanabe | 395/275 |
| 5,086,387 | 2/1992 | Arroyo et al. | 395/750 |
| 5,086,501 | 2/1992 | DeLucal et al. | 395/550 |
| 5,121,390 | 6/1992 | Farrell et al. | 395/200 |
| 5,121,487 | 6/1992 | Bechtolsheim | 395/325 |
| 5,146,607 | 9/1992 | Sood et al. | 395/800 |
| 5,165,024 | 11/1992 | Swlazey | 395/325 |
| 5,167,024 | 11/1992 | Smith et al. | 395/750 |
| 5,169,078 | 7/1992 | Groves et al. | 395/550 |
| 5,187,780 | 2/1993 | Clark et al. | 395/325 |
| 5,193,149 | 3/1993 | Awizzio et al. | 395/325 |
| 5,195,185 | 3/1993 | Marenin | 395/325 |
| 5,237,697 | 8/1993 | Nakano | 395/750 |
| 5,247,655 | 9/1993 | Khan et al. | 395/750 |

OTHER PUBLICATIONS

D. Patterson et al., "A Case for Redundant Arrays of Inexpensive Disks (RAID)," Report No. UCB/CSD 87/391, Dec. 1987.

Product Description, Micropolis 1804 SCSI Parallel Drive Array, Document No. 108120 Rev. A.

Program Summary, DataStorage 86, An International Forum, Sep. 22–24, 1986, Red Lion Inn, San Jose, Calif.

H. Sierra, "Assessing the Promise of Disk Arrays," Canadian Datasystems, May 1989, pp. 52–53.

D. Simpson, "RAIDs vs. SLEDs." Systems Integration, Nov. 1989, pp. 70–82.

Mike, Sisley, "Microprogram Development Technique Adds Flexibility," New Electronics, vol. 17, No. 23 Nov. 27, 1984, pp. 35–38.

J. Voelker, "Winchester Disks Reach for a Gigabyte," IEEE Spectrum, Feb. 1987, pp. 64–67.

| MSB | | | | | | | | | | | | | | | | | | | | | | | | | | | | | | | LSB |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
| | | | | | | | | | | | | | | | | | | | | | | | | | | | | | | | |
| 0 | | | | | | | | | | | | | | | | | | | | | | | | | | | | | | | | 182 COMPARE WORD FROM THE SLAVE ELEMENT |
| 0 | | | | | | | | | | | | | | | | | | | | | | | | | | | | | | | | 184 COMPARE WORD FROM THE REQUESTER ELEMENT |
| 0 | | | | | | | | | | | | | | | | | | | | | | | | | | | | | | | | 186 SLAVE ELEMENT ADDRESS COUNTER CONTENT |
| 1 | | | | | | | | | | | | | | | | | | | | | | | | | | | | | | | | VARIOUS STATUS BITS |

NOTICE THE MSB

NOTE: TRANSFER CANCELLED BY THE SLAVE ELEMENT DUE TO SLAVE ERROR

DUAL CHANNEL DATA BLOCK TRANSFER BUS

This is a continuation of application Ser. No. 07/505,296 filed Apr. 5, 1990, now abandoned.

BACKGROUND

The present invention relates to high volume buses for transferring data.

In many computer systems, it is often necessary to transfer large blocks of data between the computer and a storage unit. The buses used for this type of data transfer must usually compromise between the number of lines required for the bus and the speed at which a transfer can be accomplished. Typically, the more lines that are used, the greater the speed that can be achieved. In addition, a bus may be optimized for the average size of a block of data to be sent and the average number of users to be desiring access to the bus. Some sort of arbitration mechanism is necessary to decide which user gets to use the bus at any particular time.

SUMMARY OF THE INVENTION

The present invention provides a block transfer data bus having two separate paths, with each element coupled to the bus having the ability to arbitrate for use of one or the other or both of the bus halves. One or both bus halves may be used depending on a number of factors, such as the configuration of the receiving element, the availability of the bus, and the optimum usage for a given configuration of elements. Each bus half includes an address/data bus portion for sending/receiving the data and addresses. A separate control bus portion for each bus half provides certain status signals and a code indicating the type of data on the address/data bus. An arbitration bus provides data request signals from each interface module to a central arbiter. In addition, a separate grant signal for each bus half is provided back to each element from the arbiter along the arbitration bus. A line on each control bus portion indicates whether or not it is busy. An "element" as used herein refers to a processor and the hardware it directly controls, including an interface module for interfacing with the bus.

A single arbiter controls both buses and can respond to a signal from an element indicating that it wants one or the other or both buses. An element can do a double-width data transfer, with data on both bus halves simultaneously. For this case, the arbitration bus is used to request a double-width transfer, which is granted by the arbiter asserting the request grant signal on both halves.

Each interface module includes a request FIFO memory. Before requesting use of one or both halves of the bus, the processor for an element will load the request FIFO of the interface module with the destination element ID, the beginning address of the data transfer, the direction of the data transfer, whether it is a broadcast write mode, whether use of half or all of the bus is being requested, the beginning address at the destination, the amount of data being transferred and data compare enable information. By use of this FIFO, the data necessary to initiate a transfer can be quickly loaded onto the address/data bus after the interface module receives the bus grant signal.

Each interface module also contains a status FIFO with information on the status of the transferring interface module. The status FIFO information is updated during the transfer when an error signal is received or at the end of a transfer.

For a fuller understanding of the nature and advantages of the invention, reference should be made to the ensuing detailed description taken in conjunction with the accompanying drawings.

BRIEF DESCRIPTION OF THE DRAWINGS

FIG. 16 is a diagram of the contents of a status FIFO in an interface module of FIG. 1 for a single slave element transfer;

DETAILED DESCRIPTION OF THE PREFERRED EMBODIMENT

Figure 1:
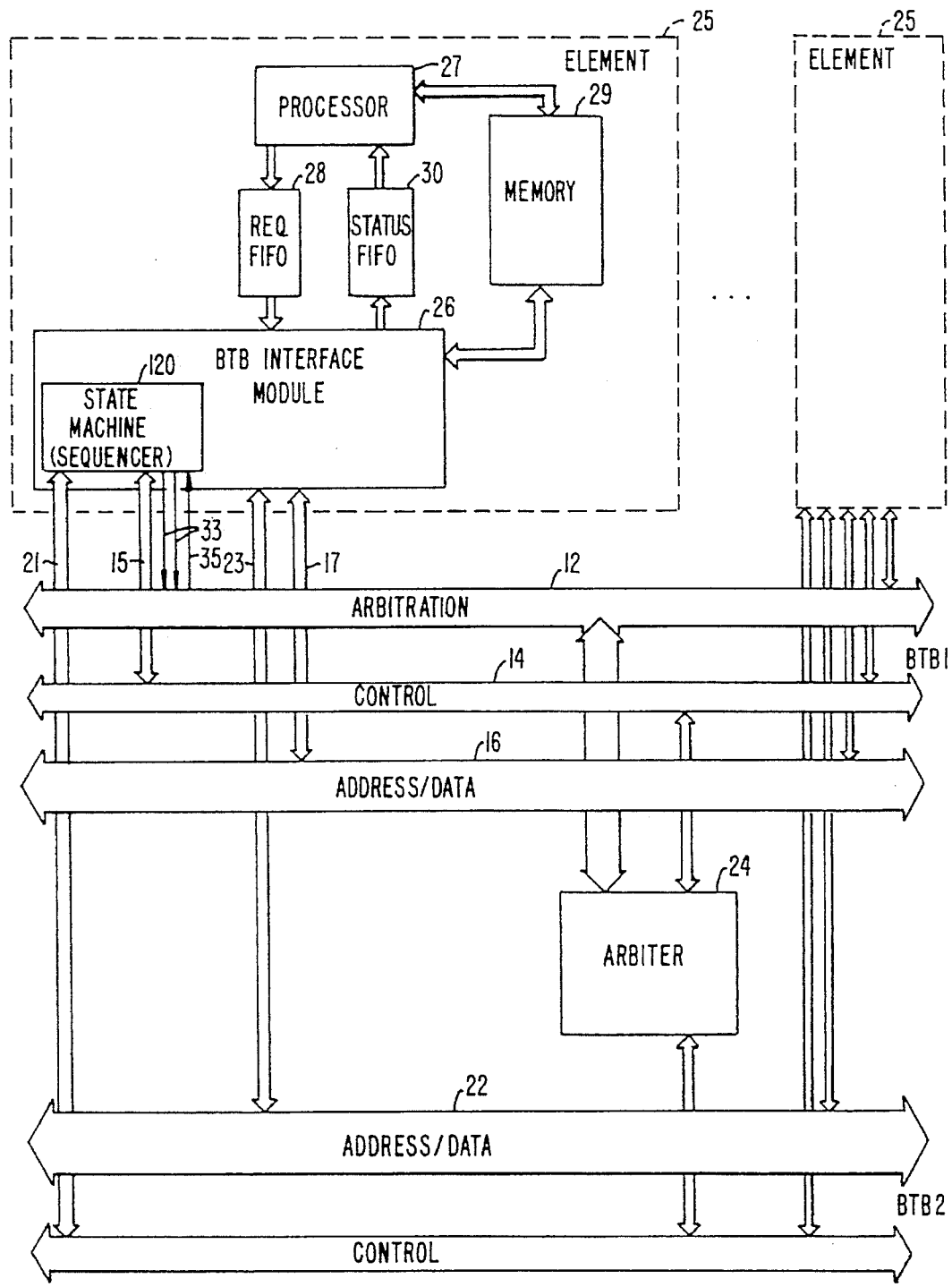
FIG. 1 is a block diagram showing an interface module and arbiter coupled to the two halves of the block transfer bus according to one embodiment of the present invention.

FIG. 1 shows a block transfer bus (BTB) according to one embodiment of the present invention divided into two channels indicated as BTB1 and BTB2. BTB1 includes a control bus 14 and an address/data bus 16. BTB2 includes a control bus 20 and an address/data bus 22. A single arbitration bus 12 is used for both channels. A single arbiter 24 is shown coupled to arbitration bus 12 and control buses 14, 20 of each of BTB1 and BTB2.

The bus is used by elements in a data storage subsystem.

Each element may send data to or receive data from an external computer, a disk drive, or another element, depending on the location of the element in the system. A plurality of elements 25 are coupled to the two buses. Each element includes, for BTB transfers, its own processor 27, memory 29 and BTB interface module 26. Each element has a request FIFO 28 and a status FIFO 30 coupled between processor 27 and BTB interface module 26.

Each BTB interface module 26 has a state machine or sequencer 120 which controls bus transfers and is coupled to each of control buses 14 and 20 by connectors 15 and 21, respectively. In addition, state machine 120 provides a request output on lines 33 and receives a grant input on lines 35 of arbitration bus 12. Data and addresses are provided through connectors 17 and 23 to address/data buses 16 and 22, respectively.

In operation, any of elements 25 desiring to send data over the BTB make a request to the arbiter 24, and, after arbitration, are granted control of the BTB and become the master for that transfer, as will be described below. The element 25 which is selected by the master becomes the slave. The general operation of element 25 in initiating a bus transfer is as follows. Processor 27 loads FIFO 28 with the necessary instructions regarding the transfer. BTB interface module 26 detects the presence of instructions in FIFO 28, and asserts an appropriate request on arbitration bus 12 in accordance with the instructions. When a grant signal is received from arbiter 24, the data transfer is started. Upon completion, or in the event of an error, status information regarding the transfer is loaded into status FIFO 30, where it can be read by processor 27.

Figure 2:
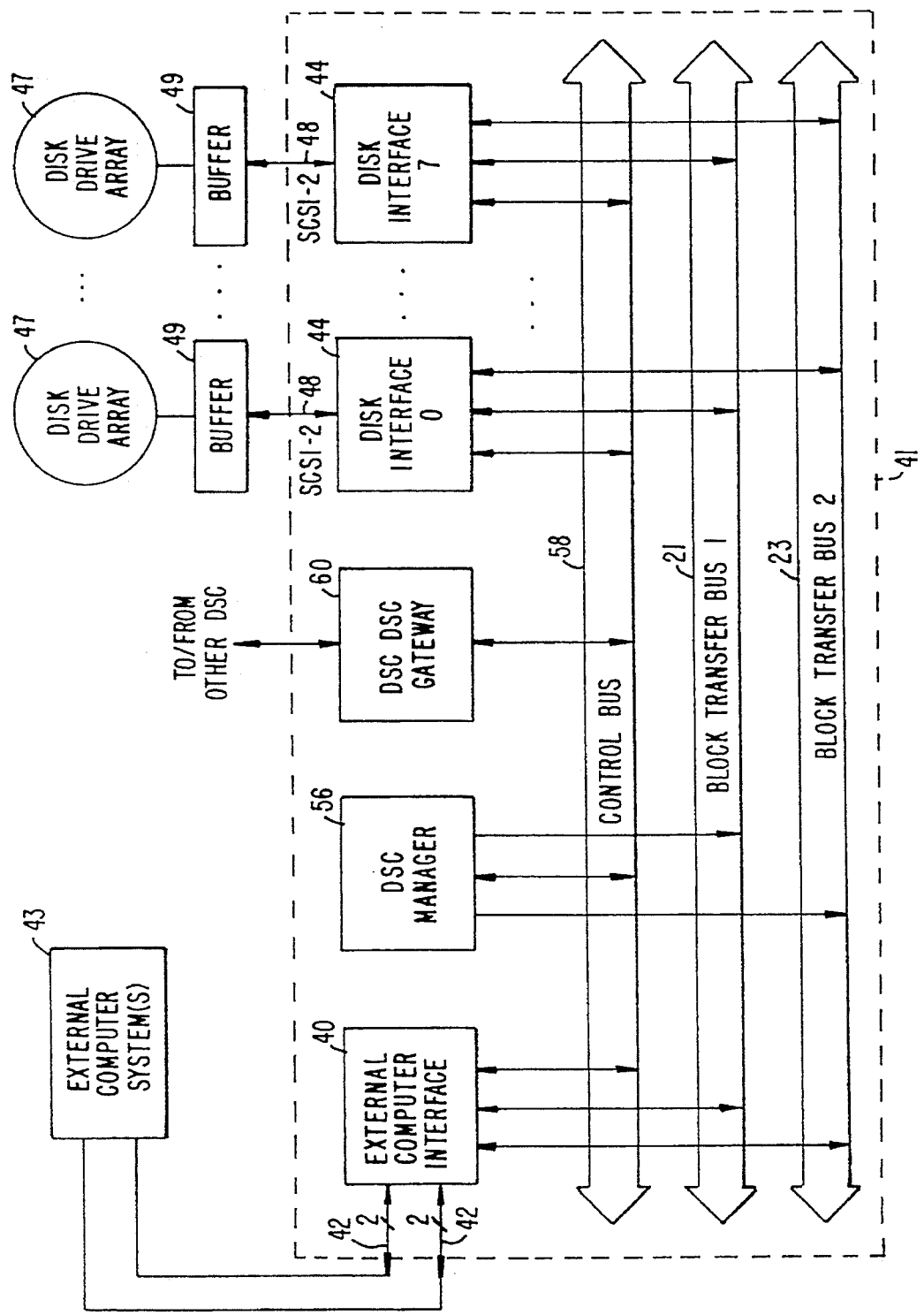
FIG. 2 is a block diagram of a data storage controller using the bus of FIG. 1.

FIG. 2 shows one embodiment of a system using the block transfer bus of the present invention. A dynamic storage controller 41 is shown having an interface 40 coupled to two channel connectors 42. Connectors 42 connect to one or more external computer systems 43. Data from the computer system is provided through either of connectors 42, one or both of block transfer bus halves 21 and 23, and then through one of interfaces 44 to an array of disk drives 47 through individual buffers 49 coupled to one of SCSI-2 buses 48. A dynamic storage control manager 56 contains the arbiter 24 of FIG. 1 and also otherwise controls the system through a separate control bus 58. Another interface 60 provides connections to another dynamic storage controller.

The block transfer buses provide the means for the transfer of digital information between elements over the motherboard/backplane in the dynamic storage controller (DSC). The total number of physical elements supported by the block transfer bus is 16 in the embodiment described. The elements may contain one or more processors and immediate peripherals such as memory. The block transfer bus consists of two separate bus halves, namely block transfer bus 1 and block transfer bus 2. The data transfer rate supported by each block transfer address/data transfer bus is 40 MB/sec in the embodiment described.

The purpose of providing two identical bus halves is to increase the degree of fault tolerance survivability of the system and to achieve an 80 MB/sec data transfer rate when both bus halves are used together as one bus. Alternately, the two bus halves can be used for two separate, simultaneous 40 MB/sec transfers.

Block Transfer Bus Interface Module 26

Figure 3A:
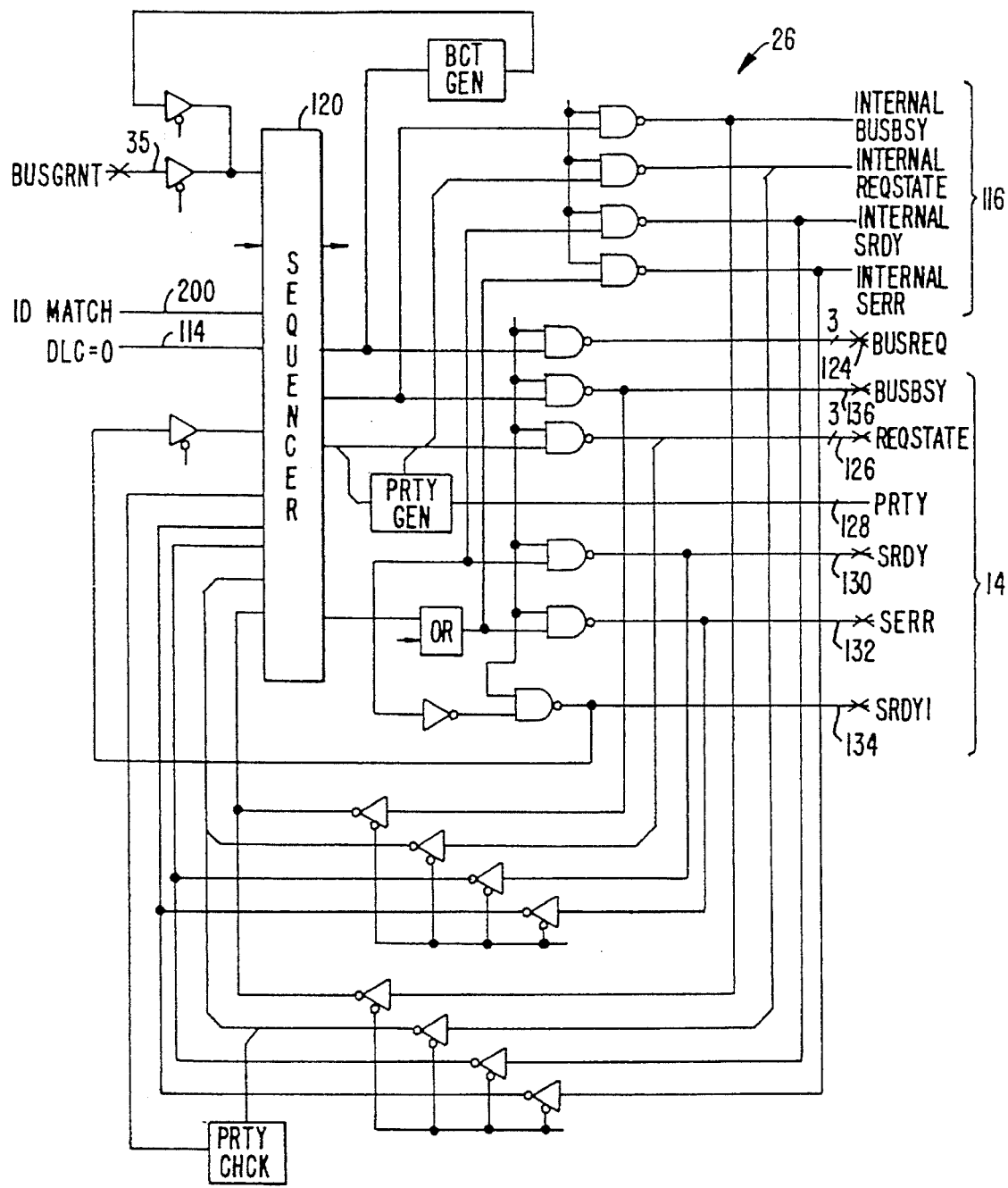
FIGS. 3A and 3B are more detailed block diagrams of one of the interface modules of FIG. 1.
Figure 3B:
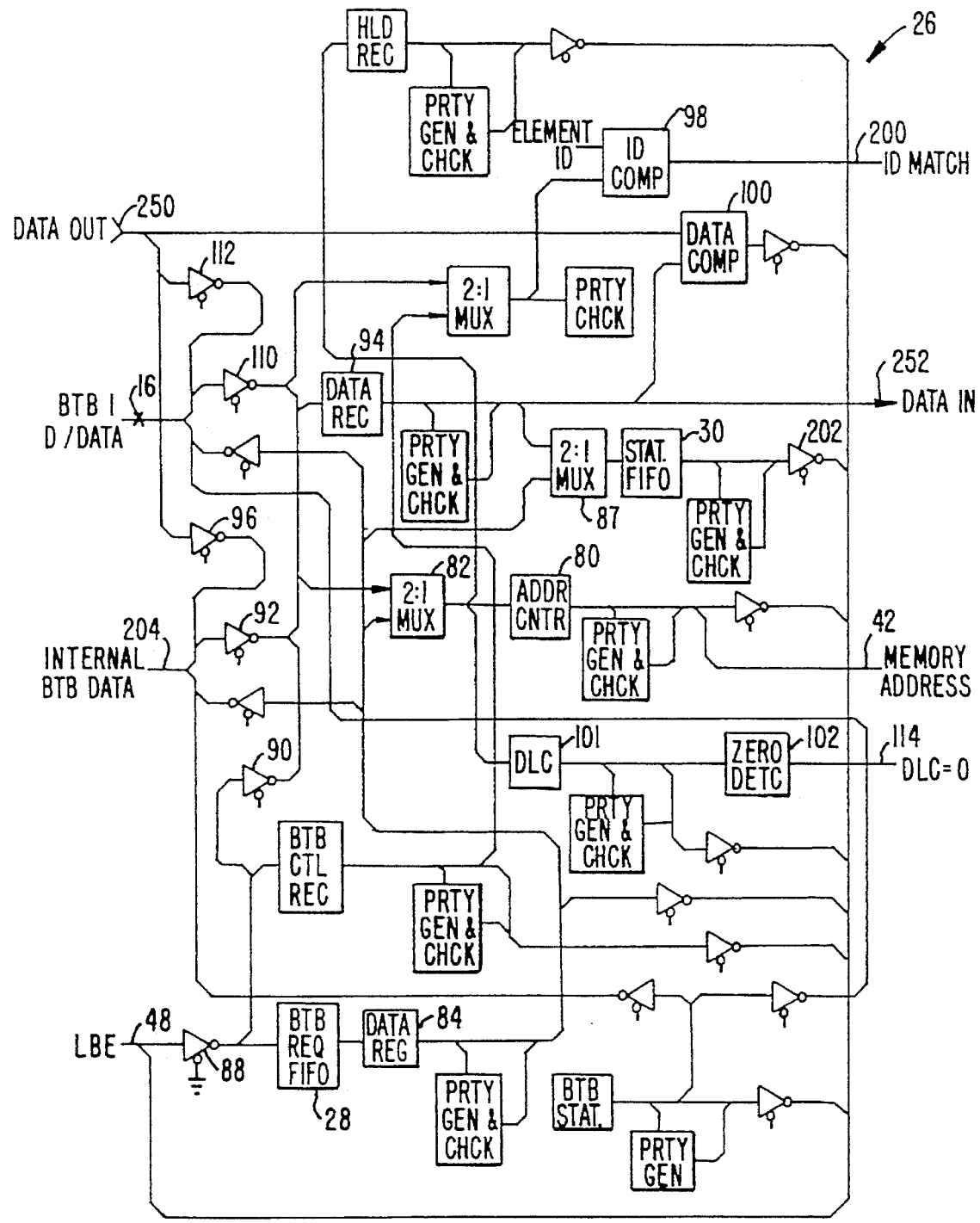

FIGS. 3A and 3B show the details of a block transfer bus interface module 26 along with request FIFO 28 and status FIFO 30. The interconnection of FIFOs 28, 30, processor 27 and memory 29 are shown in a simplified manner in FIG. 1.

For instance, interface module 26 actually provides an address directly to memory 29 on output bus 42 as shown in FIG. 3B. When interface module 26 is acting as a slave, the beginning address for the data transfer is provided over BTB1 address/data bus 16 through a multiplexer 82 to an address counter 80. Address counter 80 then provides the addresses for the data transfer by being incremented for each word and providing the address over bus 42 to memory 29.

The data being transferred is provided on bus 16 after the starting address, as will be explained in more detail in connection with the timing figures which follow. The data is provided through gate 110 and data register 94 to a bus 252 which is coupled to the data inputs of memory 29.

A local bus extension (LBE) 48 is coupled to processor 27 and can also provide a starting address through FIFO 28, data register 84 and multiplexer 82 to address counter 80. This path would be used to load address counter 80 when interface module 26 is the requester of the data transfer. The addresses from address counter 80 would then provide the location in memory 29 for data access to memory 29. Data out bus 250 is coupled to the data output of memory 29, and provides the data through a gate 112 to bus 16.

A data length counter (DLC) 101 is loaded through multiplexer 82 from processor 27 (through FIFO 28 and register 84) or bus 16 with the length of the data transfer. During the transfer, DLC 101 counts down until it reaches zero. A zero detect circuit 102, coupled to DLC 101, provides a signal to sequencer 120 of FIG. 3A on a line 114. Sequencer 120 controls transfers of data as shown in the state machine diagram of FIGS. 18 and 19 discussed below.

Sequencer 120 has inputs and outputs coupled to the control lines of control bus 14 (the individual control lines are described below). Bus grant lines 35 from arbitration bus 12 are also provided as an input to sequencer 120.

Only control bus 14 has been shown in FIG. 3A for ease of understanding. Similar connection are provided for control bus 20 of FIG. 1. Also, in FIG. 3B, only BTB1 address/data bus 16 has been shown. Similar connections are provided for address/data bus 22 of FIG. 1.

A separate internal BTB address/data bus 204 and control bus 116 are used for diagnostic purposes.

Figure 4:
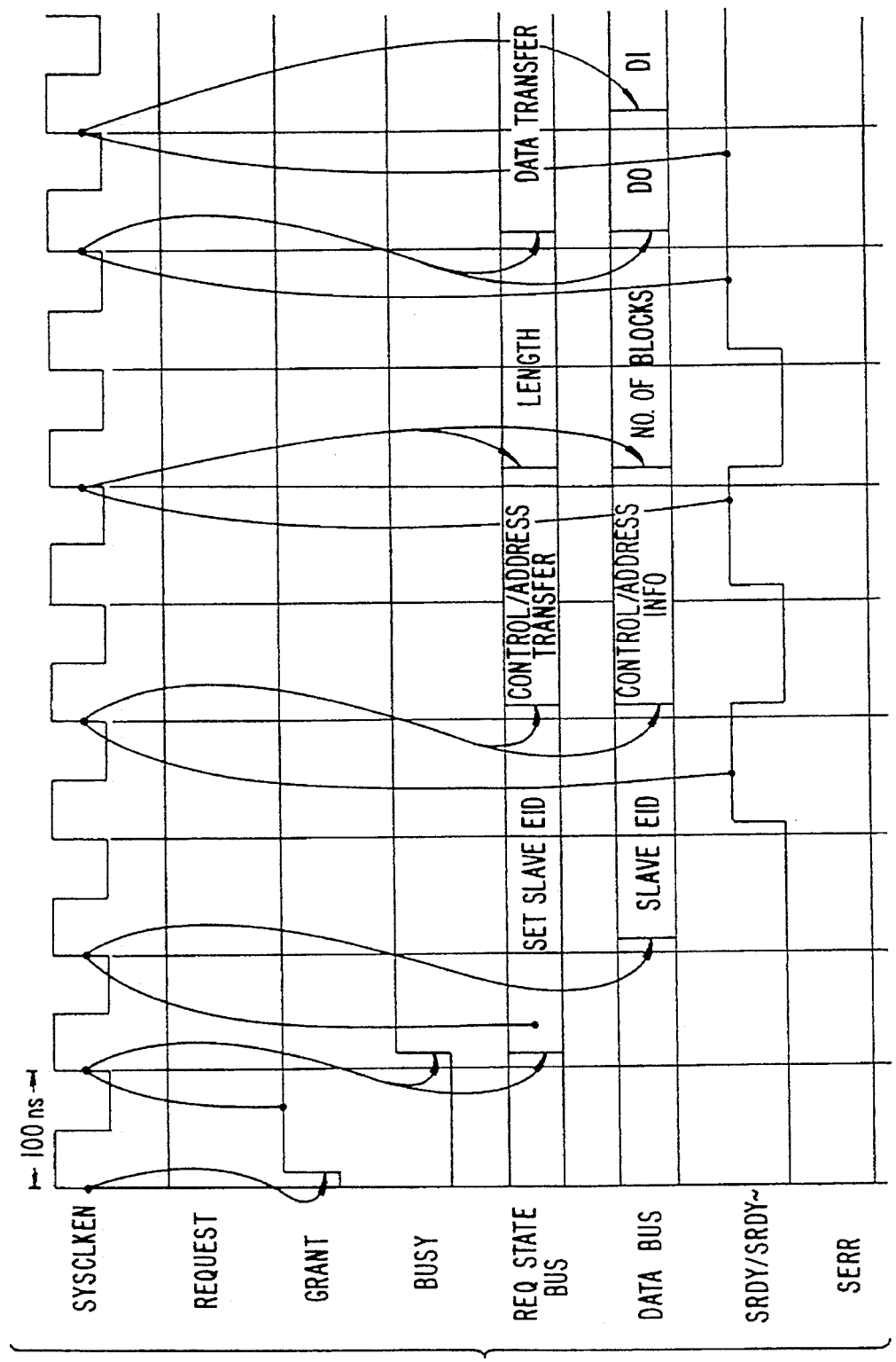
FIG. 4 is a timing diagram of a single slave write operation using the bus of FIG. 1.

Returning to FIG. 3B, an ID comparator 98 is used to enable the interface module 26 to act as a data transfer slave. When not acting as a master, BTB interface module 26 monitors BTB 21 and 23 during the "select slave element ID" phase of the request state bus, as seen in FIG. 4, reads the element ID, and compares it in ID comparator 98 with its own element ID. If there is a match, sequencer 120 (FIG. 3A) is signalled through ID match line 200 and proceeds to act as the slave during the subsequent transfer. A data comparator 100 is used to compare data from two sources when the operation to be performed calls for this. An example of such an operation is when the computer 43 wants to compare current data with the data written on a disk array 47. A status FIFO 30 is used to store status information regarding a transfer when a transfer is completed or otherwise terminated. Status FIFO 30 is loaded from bus 16 through gate 110, data register 94 and multiplexer 87, and it can later be examined by processor 27 over bus 48 via driver 202.

Arbitration Bus

The arbitration bus is used by requester elements and the master arbiter. Whenever an element wishes to use one or both halves of the block transfer bus for a data transfer, it makes a bus request to the master arbiter. The master arbiter arbitrates for one or both halves of the block transfer bus and, when one or both halves of the bus are free, grants one or both halves of the block transfer bus to the requester element.

The master arbiter uses a round-robin arbitration scheme for granting one or both halves of the block transfer bus to an element.

The requester element activates a "bus busy" signal, after receiving a "bus grant" signal from the master arbiter. If the requester element does not activate a bus busy signal within 300 ns, then the master arbiter deactivates the bus grant signal for the requester element and activates the bus grant signal for the next requester element wishing to use the block transfer bus.

The requester element can activate a "bus lock" condition, if it wishes to use the block transfer bus for next data transfer without activating a "bus request" to the master arbiter. To achieve this, the requester element does not drop its "bus request" and "bus busy" at the end of the transfer.

Figure 3C:
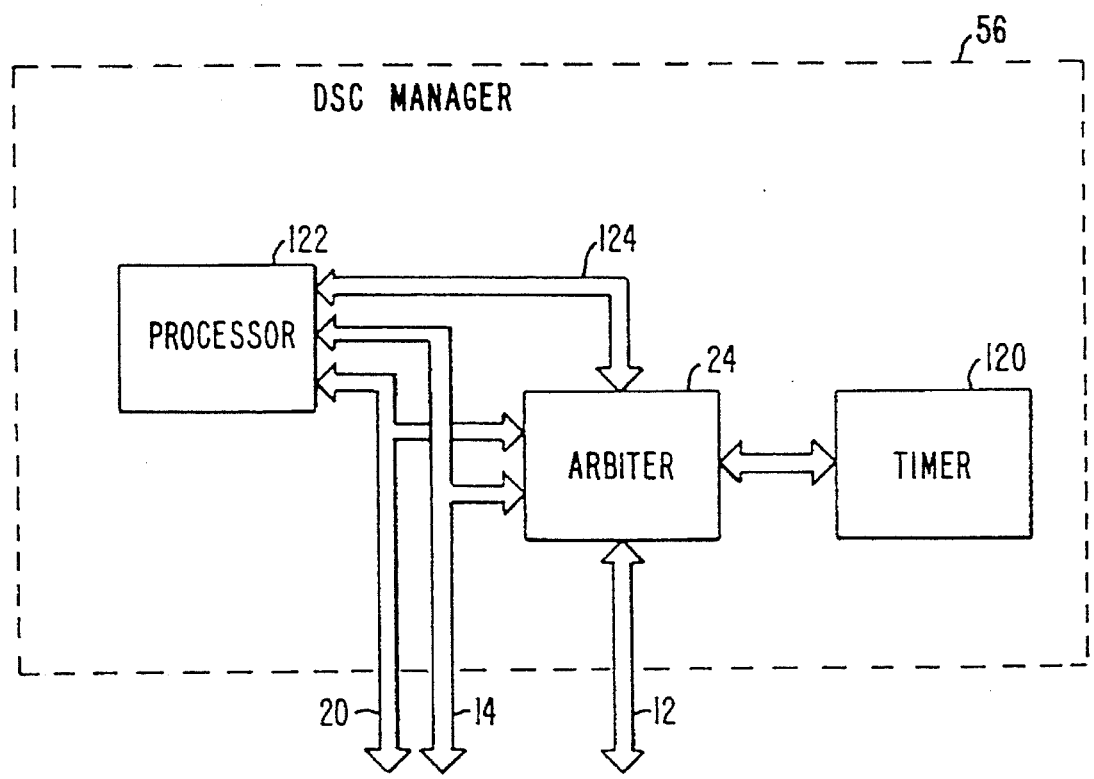
FIG. 3C is a block diagram of the DSC manager of FIG. 2.

As shown in FIG. 3C, the master arbiter 24 maintains a gross timer 120 after enabling a "bus grant" for a requester element. If the requester element does not release the bus within a pre-defined (defined at the system level) time, then the master arbiter notifies the DSC manager processor 122 on a local bus 124. The DSC manager processor 122 then instructs the master arbiter over bus 124 to force the requester off the bus by deactivating the bus grant signal of the active requester.

Each element 25 has 5 lines connected to it individually which form a part of arbitration bus 12. Three lines 124 (see FIG. 3A) are used for sending a bus request (BUSREQ) to master arbiter 24. Two lines 35, one for each bus half, are used to provide a signal from master arbiter 24 for a bus grant (BUSGRNT). For the embodiment of 16 elements, arbitration bus 12 has 80 lines (16×5).

1. Block Transfer Bus Request. Each element provides a 3-bit signal on lines 124 to arbiter 24 indicating which bus half or combination of bus halves is desired.

The bit combinations for different bus requests are set forth below:

| BTB REQ | Description |
| --- | --- |
| 000 | No buses requested. |
| 001 | Bus A requested. |
| 010 | Bus B requested |
| 011 | Both buses requested, independently. |
| 100 | Either bus requested. |
| 111 | Both buses requested, double-width transfer. |

2. Block Transfer Bus Grant. These signals are output from the master arbiter 24 on lines 35 (only 1 is shown in FIG. 3A as described above). Two signals are used, one for each bus half. Both signals must be activated for a double-width bus transfer.

Control Signal Buses 14 and 20

One of the control signal buses 14 and 20 is used by the requester element, slave element and master arbiter 24. Control bus 14 is used for data transfers using BTB1, control bus 20 for data transfers using BTB2, and control bus 14 is used for data transfers using both BTB1 and BTB2. The control signal bus indicates to the slave what type of information is on the corresponding address/data bus 16 or 22. The master arbiter 24 utilizes the information on the control bus to detect the end of the BTB bus usage by the current requester element so that the master arbiter can start a "bus grant" process for the next requester element. The information on the control signal bus includes parity bits.

Each block transfer control bus 14, 20 consists of the signals described below. Although reference is made only to control bus 14, identical lines are provided for control bus 20.

1. Requester State

Three lines 126 (FIG. 3A) of control bus 14 provide signals which define the type of data on one or both of address/data buses 16, 22 during data transfers. The meaning assigned to the different combinations of 3 bit signals on lines 126 are set forth below.

| Lines 126 | Requestor State | Contents of Data on Bus |
| --- | --- | --- |
| 000 | Select slave for transfer | slave element ID |
| 001 | Transfer control/address information | Address and control information including data transfer direction (R/W), broadcast write mode active, double-width data transfer active and slave element data transfer begin address |
| 010 | Transfer Length | Number of data transfer blocks |
| 011 | Transfer Data | Data |
| 100 | Pause | No data |
| 101 | Transfer End status | End Status word from selected slave |
| 110 | Select Slave for End Status | Slave Element ID |

2. Requester State Parity

A signal on line 128 of control bus 14 defines parity on the requester state lines 126. When the requester state lines 126 are not in use, the parity will be incorrect.

3. Slave Ready

A signal on line 130 (SRDY) acts as an acknowledgement from the slave for every word received or transferred on the address/data buses; i.e., validates the transfer of data to the master during a read operation and accepts data from the master during a write operation. A slave can force the requester element to go into pause state by deactivating this signal.

4. Slave Error

A slave error line 132 forms a part of control bus 14. While the requester element and slave element are in communication, and if the slave element detects any hardware error, this signal becomes active and that forces the requester element to go into END STATUS state. Then the slave element transfers four long status words to the requester element as described below.

5. Slave Ready Inverse

A signal on slave ready inverse (SRDYI) line 134 of control bus 14 is used during a broadcast (transfer to multiple slave elements) write type of transaction. This signal along with slave ready accepts the data on the data bus(es) by all slave elements.

6. Bus Busy

A signal on line 136 of control bus 14 indicates that address/data bus 16 is busy. This signal is asserted by the requester element which is granted bus 16.

Address/Data Transfer Buses 16 and 22

The address/data transfer bus is used by the requester element and the slave element to transfer blocks of data between the requester element and the slave element. The requester element also uses this bus to transfer the slave element ID for selection, block transfer related control information and the slave element block transfer begin address. The slave element uses this bus to transfer the end status word(s) to the requester element at the end of the block data transfer. The information on the address/data transfer bus is protected by parity.

The address/data transfer bus consists of 32 bidirectional data lines and four parity lines. Signals on the parity lines represent an even byte parity on data signals.

Block Transfer Buses Arbitration.

Every element 25 is given an unique ID. Whenever an element needs to send data to or receive data from another element, it first gains control of a specific block transfer address/data transfer bus by making "a request" to the master arbiter. There is a possibility that two or more elements may seek to do so at the same time, which will cause bus contention. The master arbiter resolves this contention and restricts control of each block transfer address/data transfer bus to one and only one element at a time.

The arbitration of the block transfer buses is according to a round-robin arbitration scheme.

A block transfer can either be single word (one bus half, BTB1 or BTB2) or double word (both bus halves, BTB1 and BTB2). The master arbiter grants use of the two bus halves, by monitoring the request states of each element, as seen on the arbitration bus.

The principles followed by the master arbiter are as follows:

1. The arbiter goes through an arbitration cycle when one or both buses are not busy or in the 'end status' phase (hereafter referred to as 'not in use').
2. The action performed by the arbiter varies according to request state, as follows:
   a. request for bus 1: grant bus 1, if not in use.
   b. request for bus 2: grant bus 2, if not in use.
   c. request for either bus: grant bus 1, if not in use, else grant bus 2.
   d. request for both buses, independently:
      i) grant currently not in use bus.
      ii) wait for other bus to be not in use.
      iii) grant that bus.
   e. request for both buses, double-width mode:
      i) wait for both buses to be not in use.
      ii) grant both buses.
3. Element requests are satisfied normally in round-robin fashion, except for the following:
   a. if an element requests a bus that is currently in use, and is requesting only that bus, skip to next element request.

Request for BTB By Requesting Element.

Figure 14:
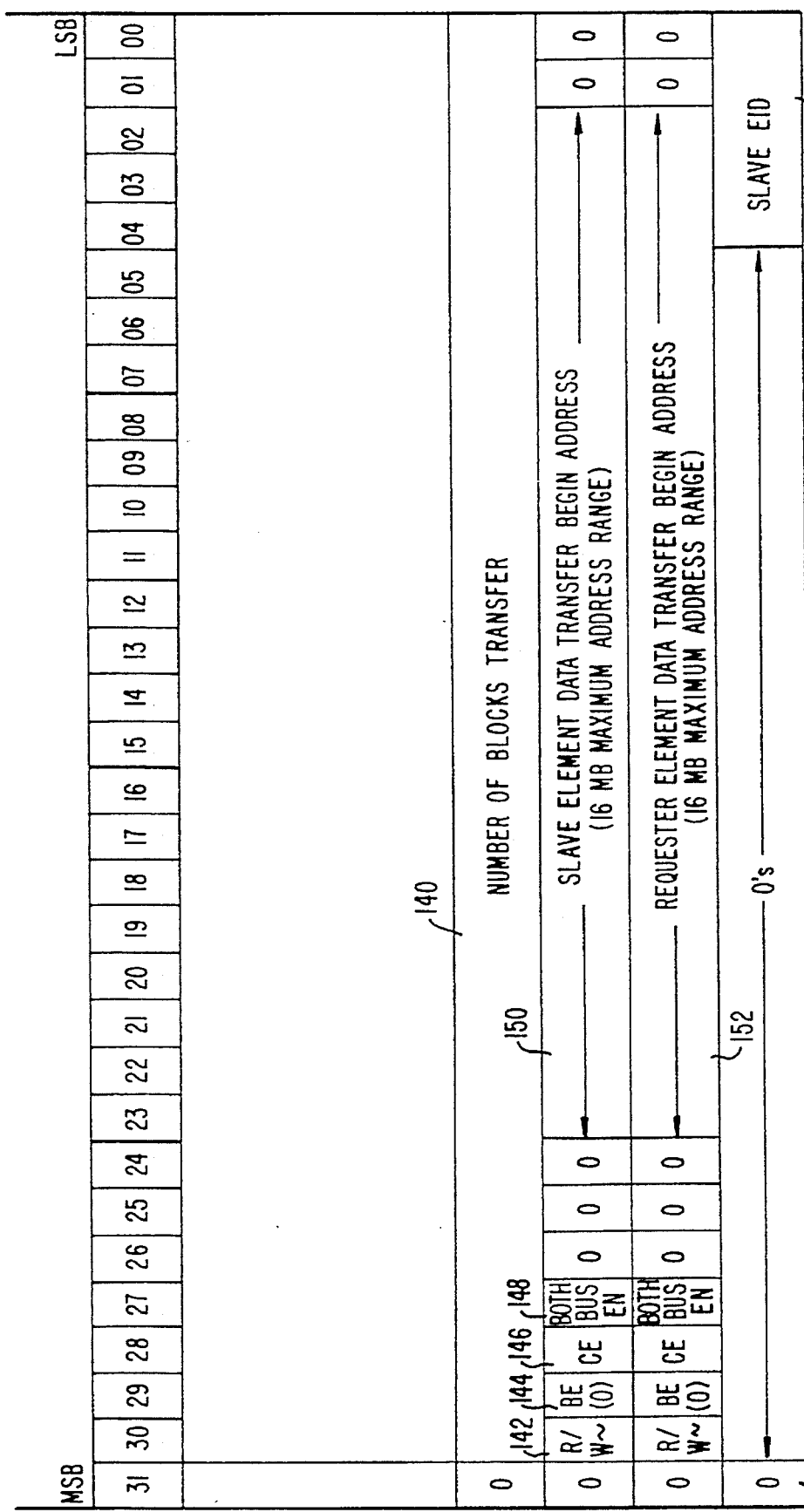
FIG. 14 is a diagram of the contents of a request FIFO in an interface module of FIG. 1 for a single slave element transfer.
Figure 15:
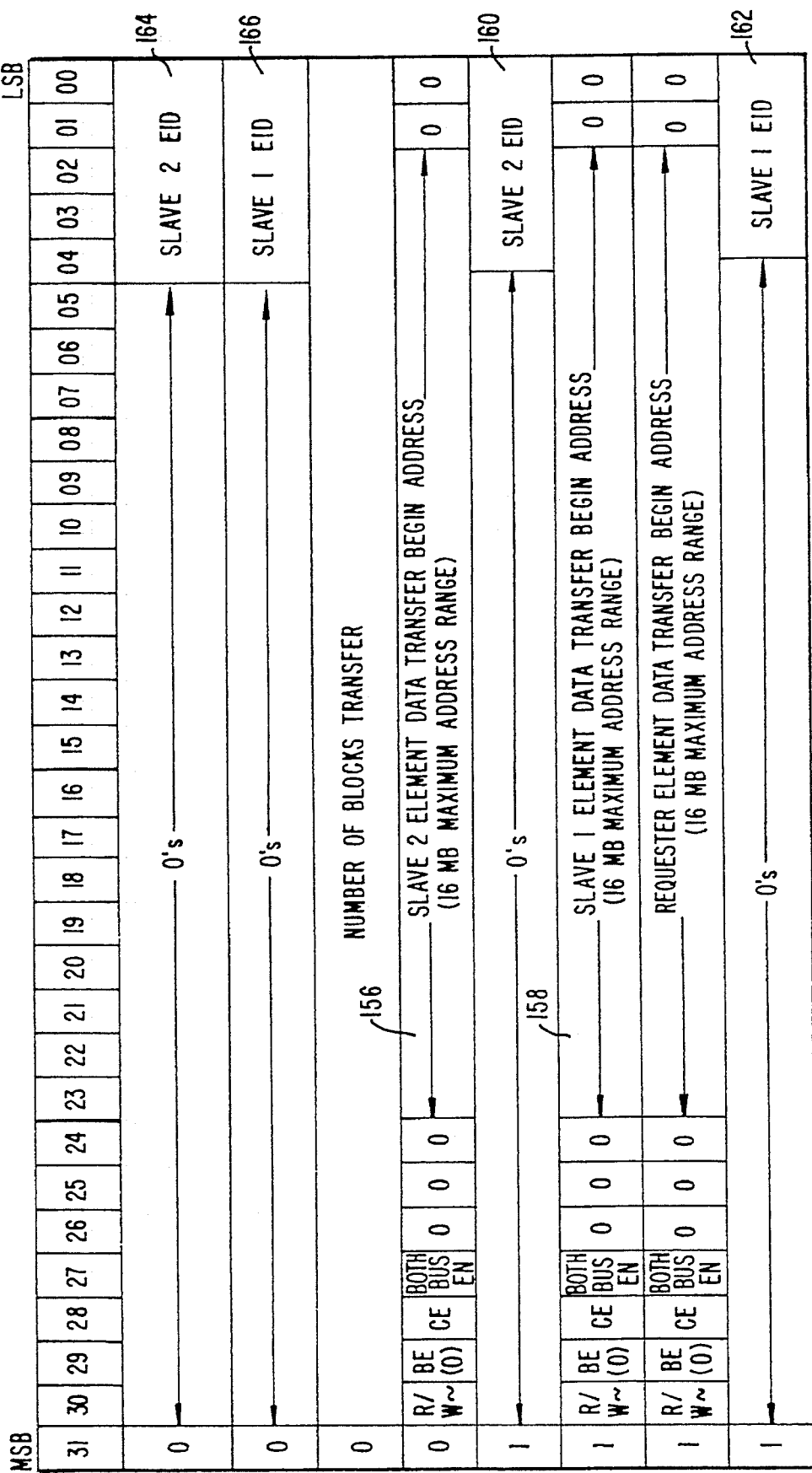
FIG. 15 is a diagram of the contents of a request FIFO in an interface module of FIG. 1 for a multiple slave broadcast write transfer.

An element processor 25 wishing to use a block transfer bus BTB1 or BTB2 (to utilize global resources such as memory) loads slave element ID, requester element data transfer begin address, data transfer direction, broadcast write mode select, data width select, slave element data transfer begin address, data transfer block count and data compare enable select into the request FIFO 28 residing on that particular block transfer bus interface module. FIG. 14 shows how this information is organized in the request FIFO 28 for a single slave element transfer and FIG. 15 shows the request FIFO contents for a multiple slave broadcast write transfer. The first word in FIGS. 14, 15 and 16 is at the bottom of the figure.

As shown in FIG. 14, a field 140 is used to indicate the number of blocks of data to be transferred. A field 142 indicates whether it is a read or write operation. A broadcast enable (BE) field 144 indicates whether this is a broadcast (to more than one slave element). Field 146 provides a compare enable (CE) bit to indicate whether data words are to be compared. Field 148 indicates whether both buses or a single bus are to be used. Field 150 indicates the starting address for the data in the slave element. Fields 142–148 are then repeated because the same information is used by the requester element. Field 152 indicates the beginning address of the data in the requester element. Field 154 is used to indicate the slave EID. FIG. 15 shows the contents of the request FIFO for a multiple slave broadcast write transfer. This is similar to the configuration of FIG. 14, except that multiple slave beginning addresses 156 and 158 are provided. In addition, multiple slave EID fields 160 and 162 are provided. The data in slave EID fields 164 and 166 are placed on bus 16 during select slave element for end status request state. A tag bit in a most significant bit position 168 for each word of the FIFO is used to indicate when to stop reading information from the FIFO during control information transfer.

The requester BTB interface module, detecting the information in the request FIFO 28, sets the request state lines 126 according to the information loaded into the request FIFO 28. Master arbiter 24 continuously monitors arbitration bus 12 and when it detects a request state set by an interface module 26, arbitrates for BTB1, BTB2, or both, and, when it is free, activates the grant lines 35 for the requester BTB interface module 26. Then the requester BTB interface module activates the block transfer bus busy line or lines 136.

If the requester element 25 does not activate the block transfer bus busy line(s) 136 within 300 ns of the activation of bus grant line(s) 35, then the master arbiter 24 deactivates the grant line(s) 35 for the requester element. The master arbiter grants the block transfer bus to the next requester element. The master arbiter can also block the requester element from continued use of the block transfer bus by deactivating the bus grant signal for that requester element. This may be necessary, for instance, to interrupt a transfer which will never complete due to hardware error.

Data Transfer After Bus(es) Access Granted.

Figure 5:
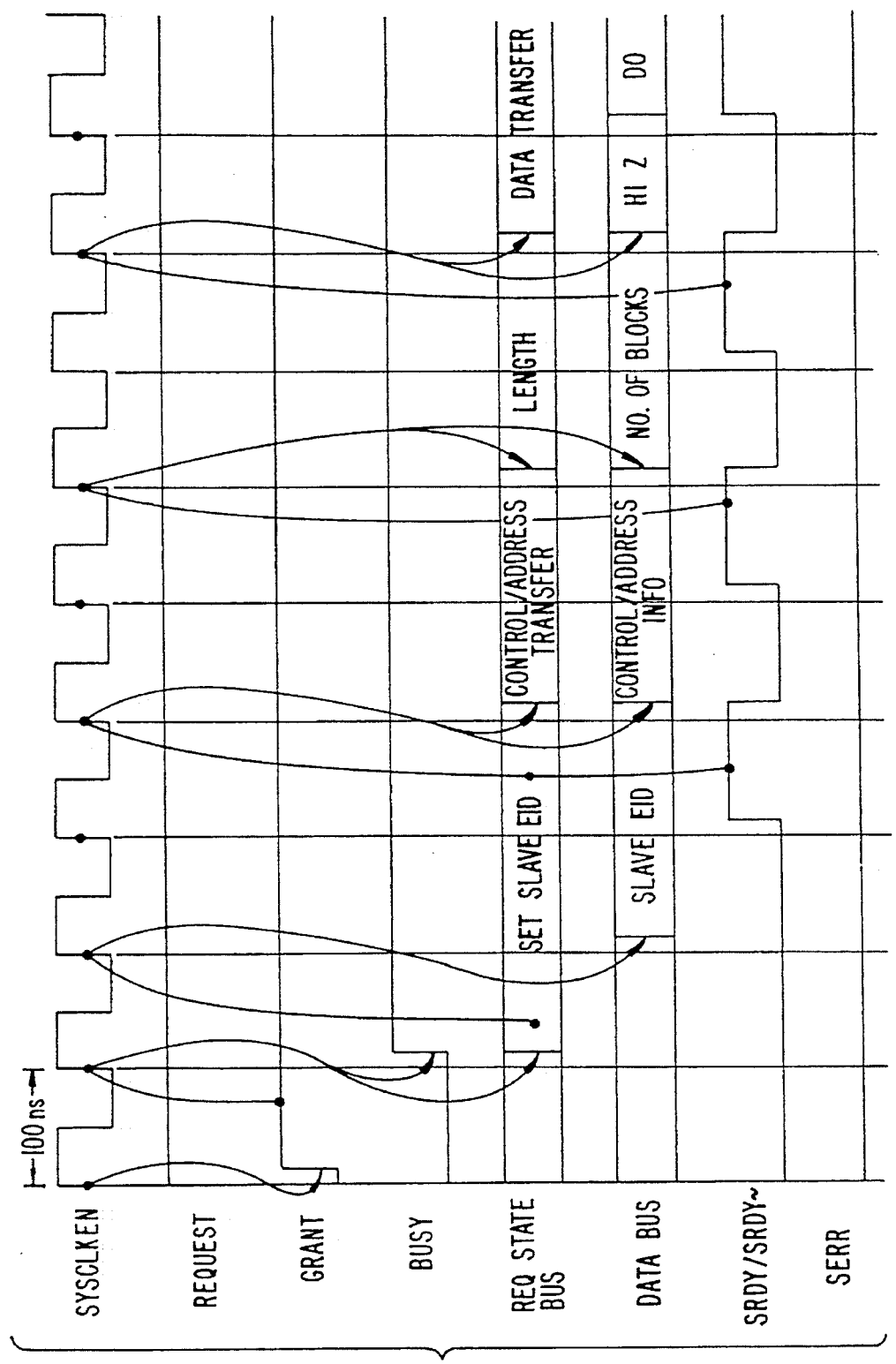
FIG. 5 is a timing diagram of a single slave read operation using the bus of FIG. 1.

The BTB interface module 26 in every requester element 25 provides a sequence of signals to control the data transfer on the block transfer buses. FIG. 4 shows the sequence for a single slave write operation. After the grant signal is received on line 35, the busy line 136 is activated. The request state lines 126 are used to indicate the type of data present on the data bus. First, the request state lines 126 indicate that the selected slave element ID is on the data bus, and the slave element ID is transmitted on the data bus. Next, control and address information, followed by the length of the transfer and finally the data itself, are transmitted. FIG. 5 shows the similar timing for a single slave read operation.

Figure 10:
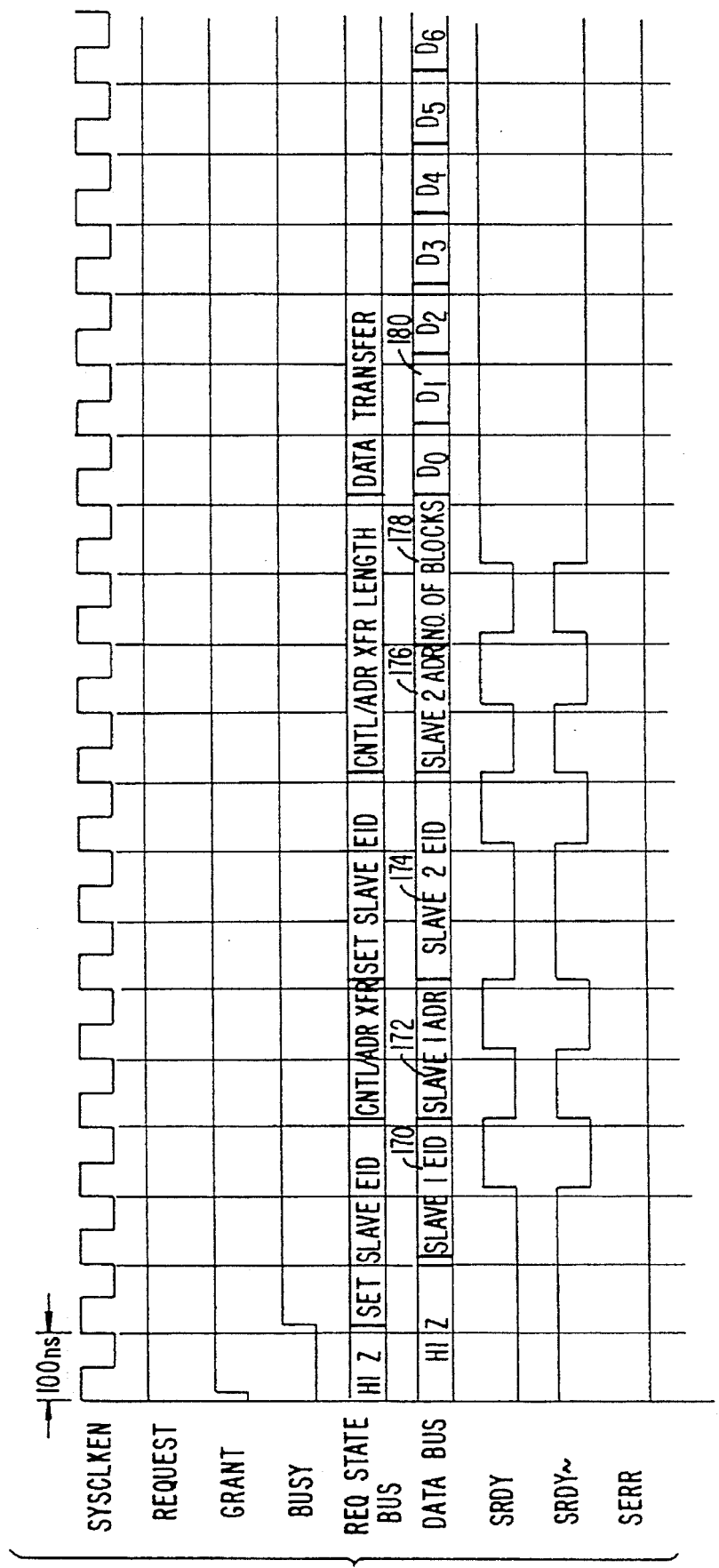
FIG. 10 is a timing diagram of a two slave broadcast write using the bus of FIG. 1.

FIG. 10 shows the timing for a two slave broadcast write. The element ID 170 for the first slave is broadcast, followed by its address information 172. Next, the element ID 174 for the second slave and its address information 176 is broadcast. This is followed by the length 178 of the transfer and the data 180 itself.

Figure 6:
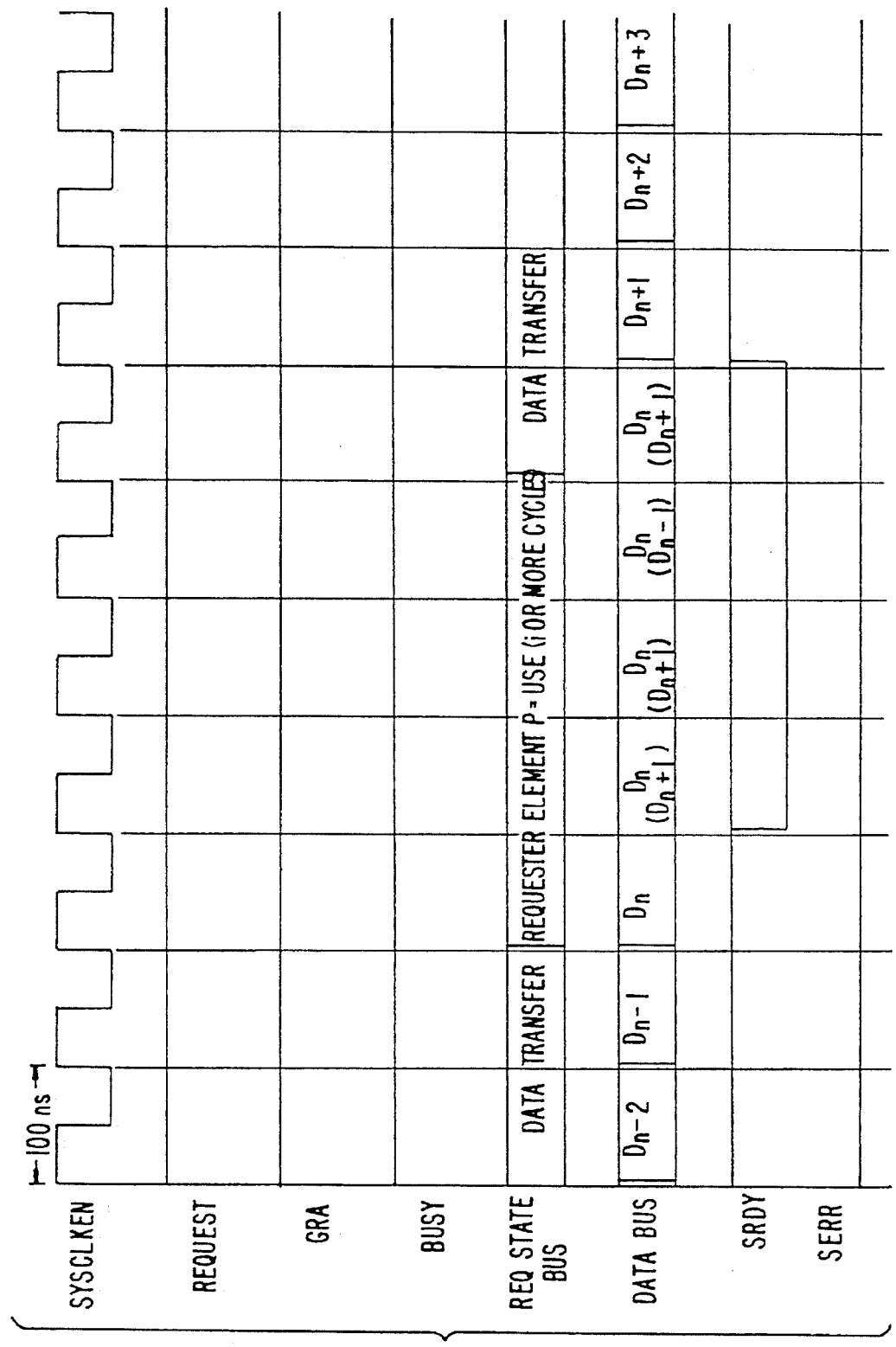
FIG. 6 is a timing diagram of a requester element pause using the bus of FIG. 1.
Figure 7:
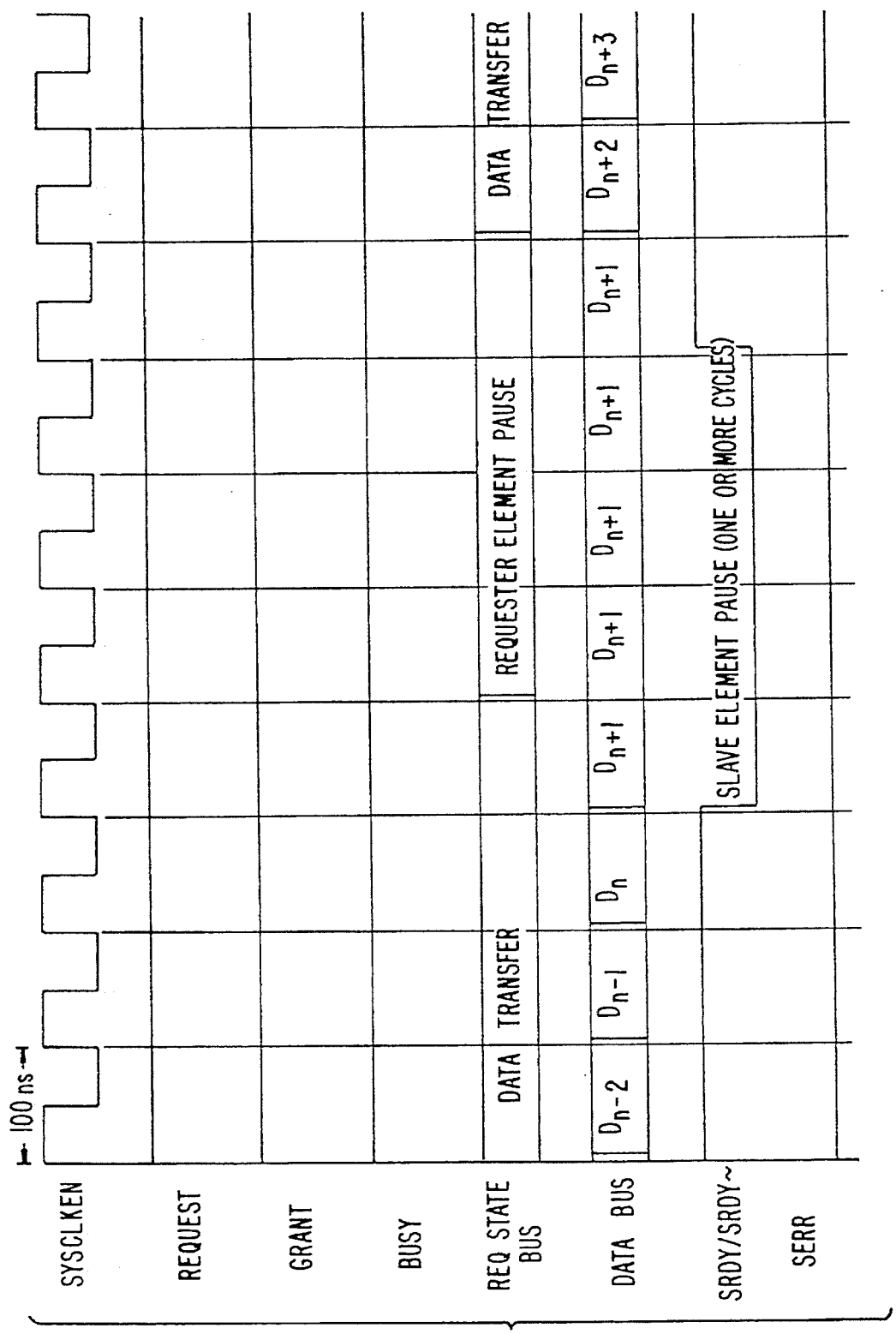
FIG. 7 is a timing diagram of a slave element pause.
Figure 11:
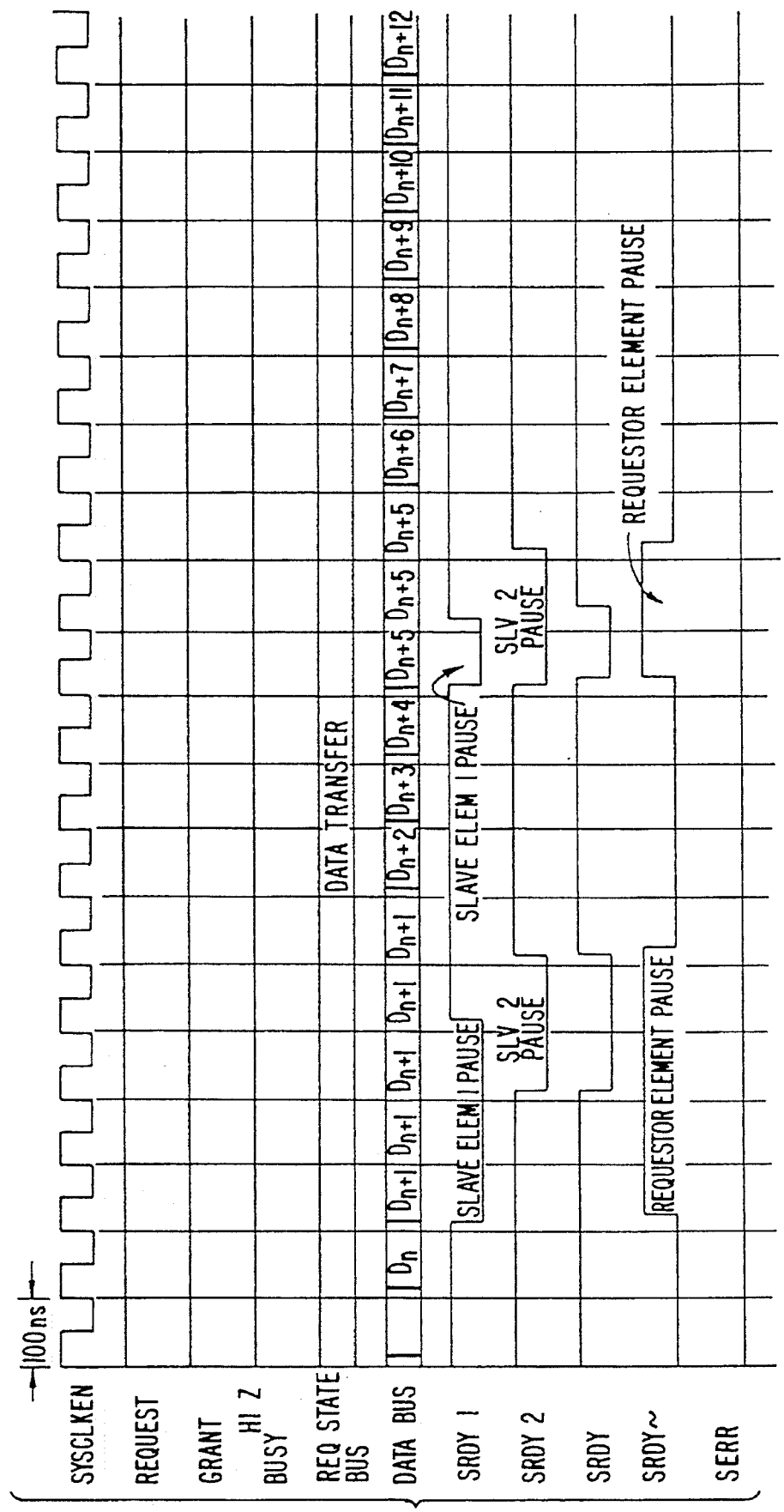
FIG. 11 is a timing diagram of a broadcast write slave element's pause using the bus of FIG. 1.

Each element 25 has the capability to pause during the data transfer on the block transfer buses. During a data transfer, a pause can be generated by either the requester element or the slave element. The requester element generates a pause by going into a pause state as shown in FIG. 6 and the slave element generates a pause by not activating the block transfer bus slave ready signal as shown in FIG. 7. FIG. 11 shows the timing of the pauses during a broadcast write.

Figure 8:
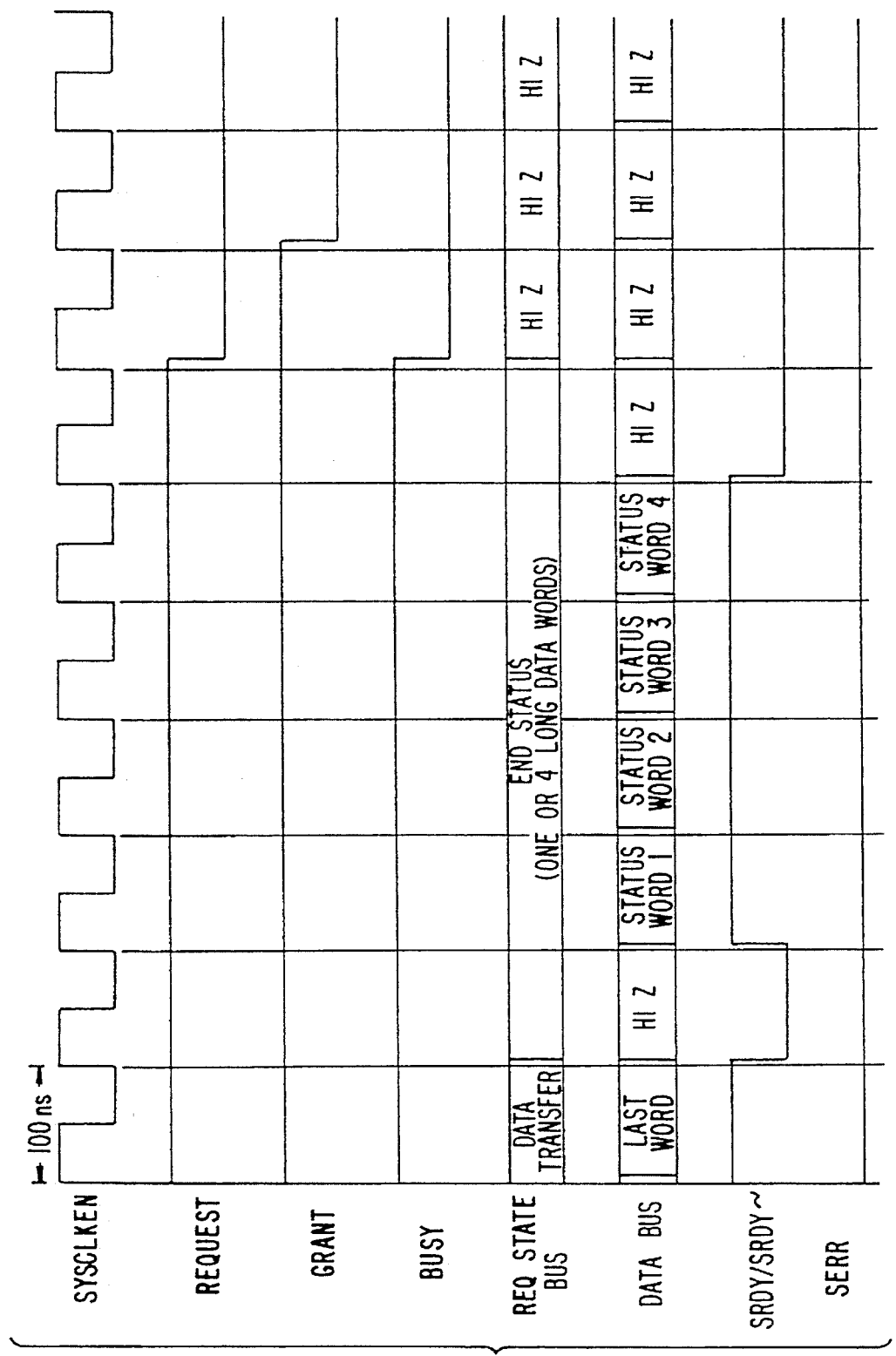
FIG. 8 is a timing diagram of a transfer ended by a requester element using the bus of FIG. 1.
Figure 12:
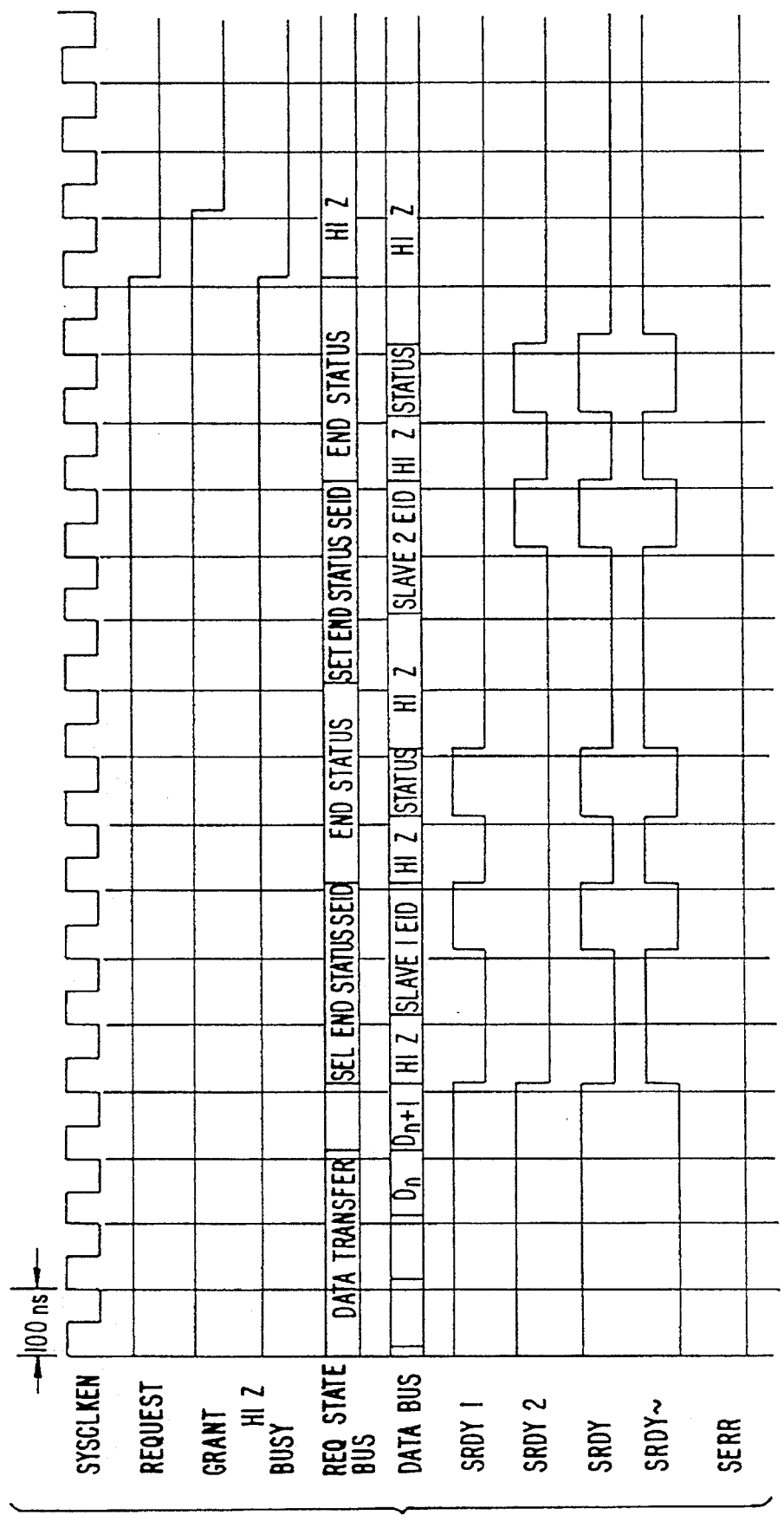
FIG. 12 is a timing diagram of a broadcast write transfer ended by requester element using the bus of FIG. 1.

At the end of the transfer the requester element goes into an END STATUS state as shown in FIG. 8 and asks the slave element to transfer end status. The timing for the end of a write transfer in the broadcast mode is shown in FIG. 12. The master arbiter sees this state of the requester element and gets ready to grant the block transfer bus to the next requester element. After the end status is received by the requester element, the requester element deactivates the "bus busy" signal.

Figure 9:
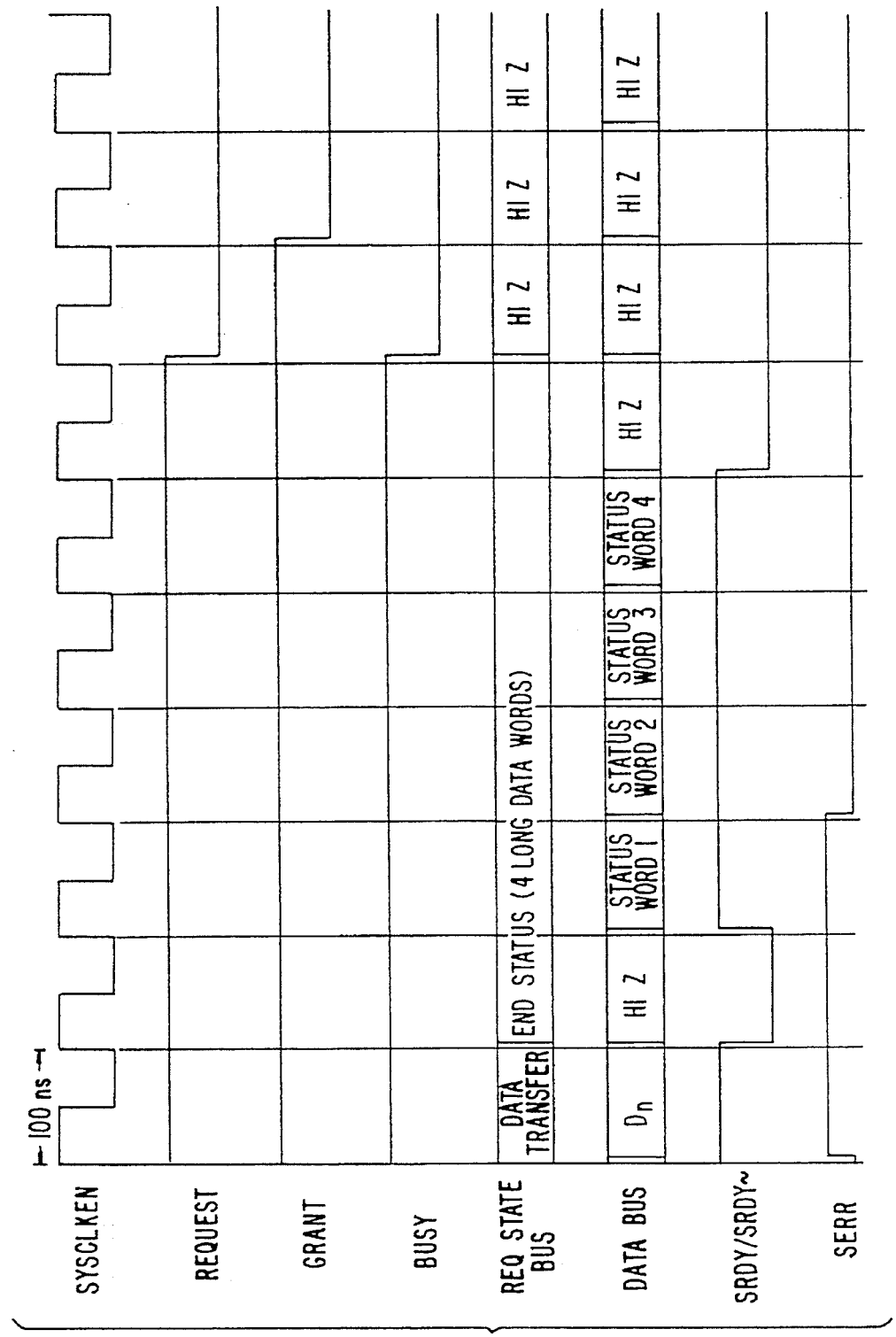
FIG. 9 is a timing diagram of a transfer cancelled by a slave element using the bus of FIG. 1.
Figure 13:
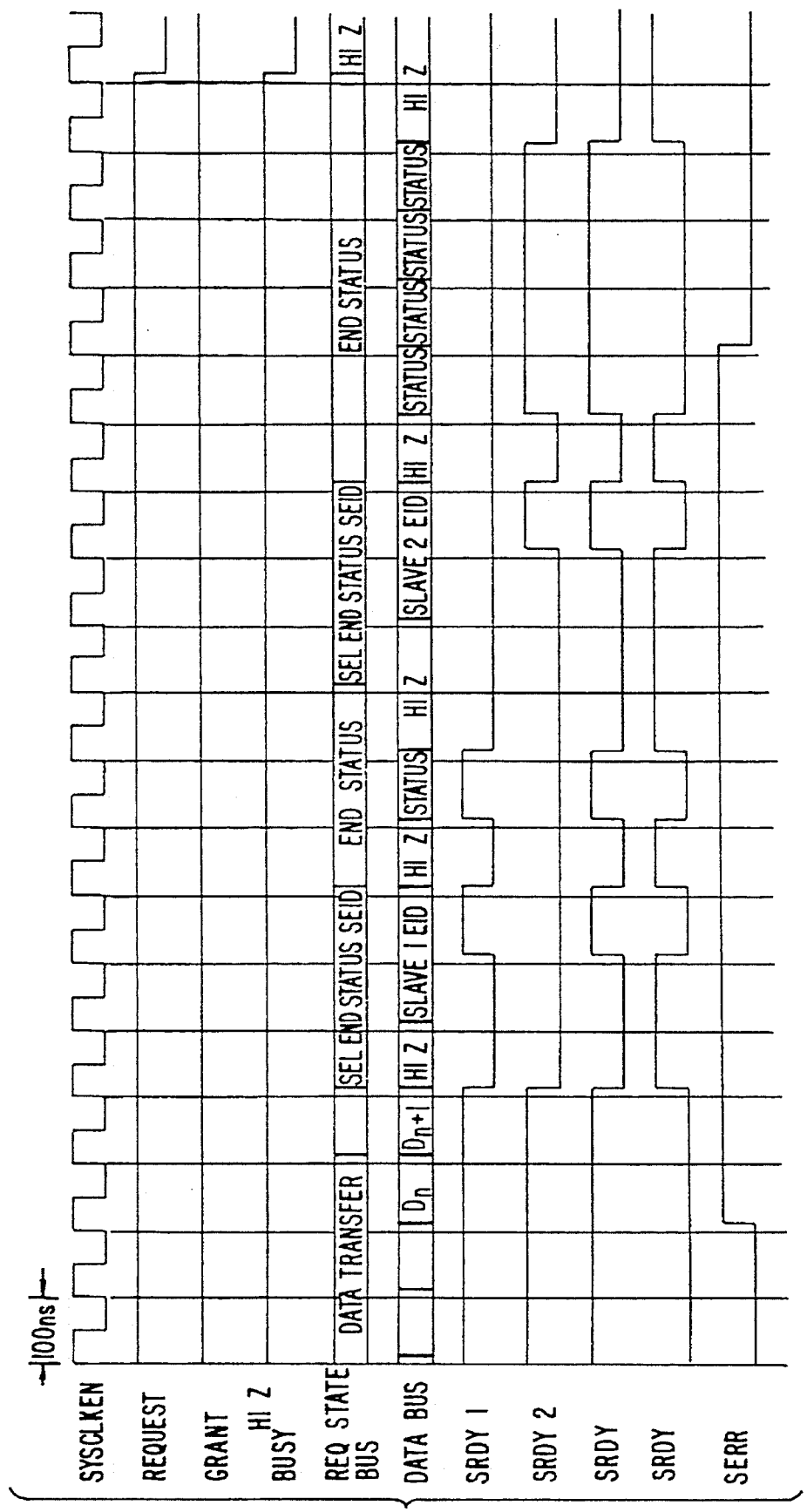
FIG. 13 is a timing diagram of a broadcast write transfer cancelled by slave element using the bus of FIG. 1.

During the data transfer, if the slave element detects parity error on the incoming/outgoing data or any other error, then the slave error signal will be activated by the slave element, which forces the requester element to go into END STATUS state and ask for the status from the slave element. This timing is shown in FIG. 9 for a single slave element transfer and in FIG. 13 for a broadcast write transfer.

Figure 17:
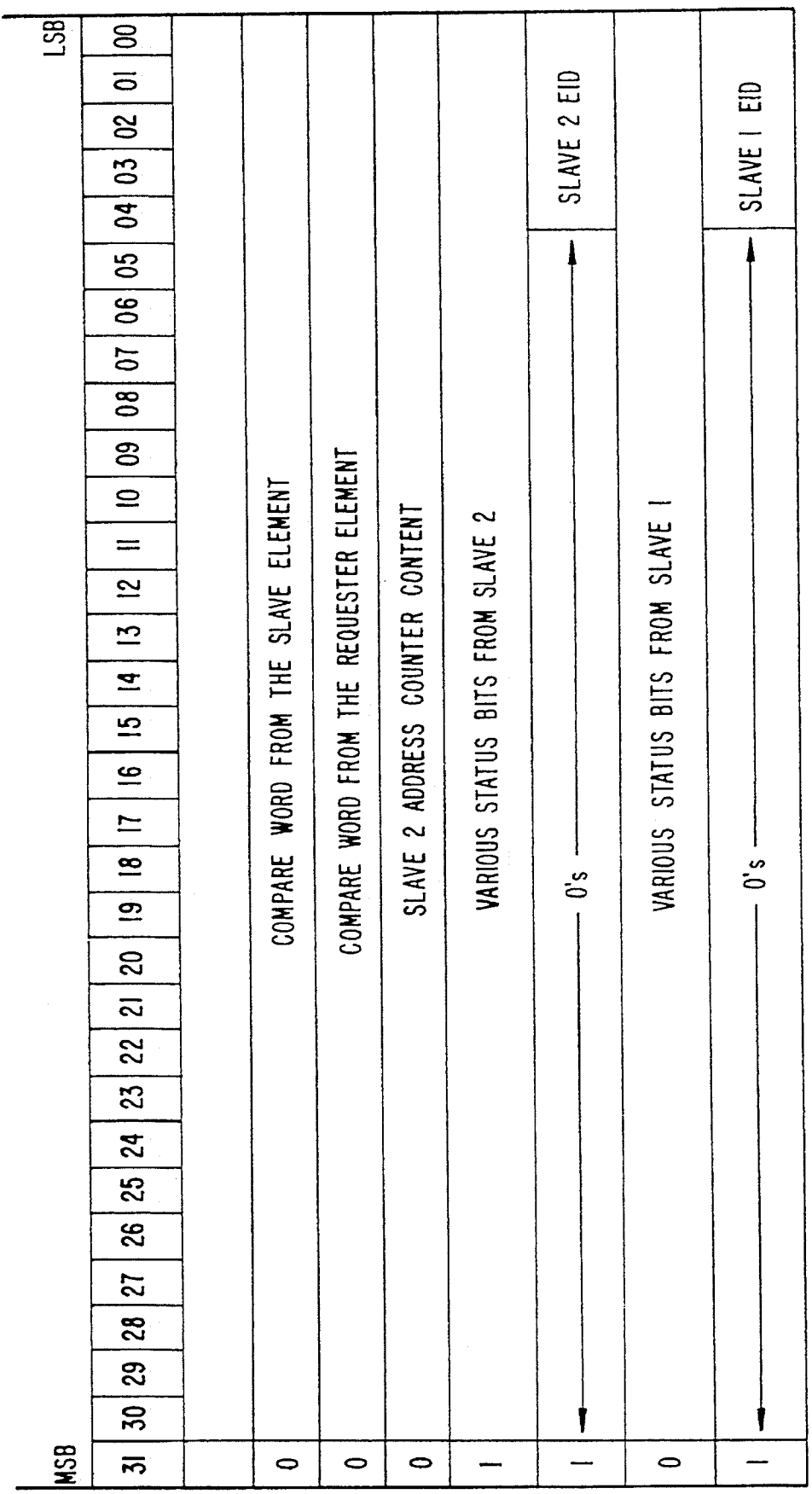
FIG. 17 is a diagram of the contents of a status FIFO in an interface module of FIG. 1 for a multiple slave broadcast write transfer.

Upon completion of a data transfer or its termination for other reasons, the status FIFO 30 of the requesting element is loaded with data indicating the status of the transfer. FIG. 16 shows an example of the data loaded into a status FIFO for a single slave element transfer where the transfer was ended due to a slave error. Portions 182, 184 of the status FIFO are reserved for compare words from the requester element and the slave element. For operations where a comparison is done, and there is an error, the two words which were compared are stored here. The slave element address counter 186 content indicates the address where the compare error occurred. FIG. 17 shows the contents of the status FIFO for a two slave broadcast write transfer where the transfer was cancelled due to an error in slave 2.

BTB Arbitration Sequencer.

Figure 18:
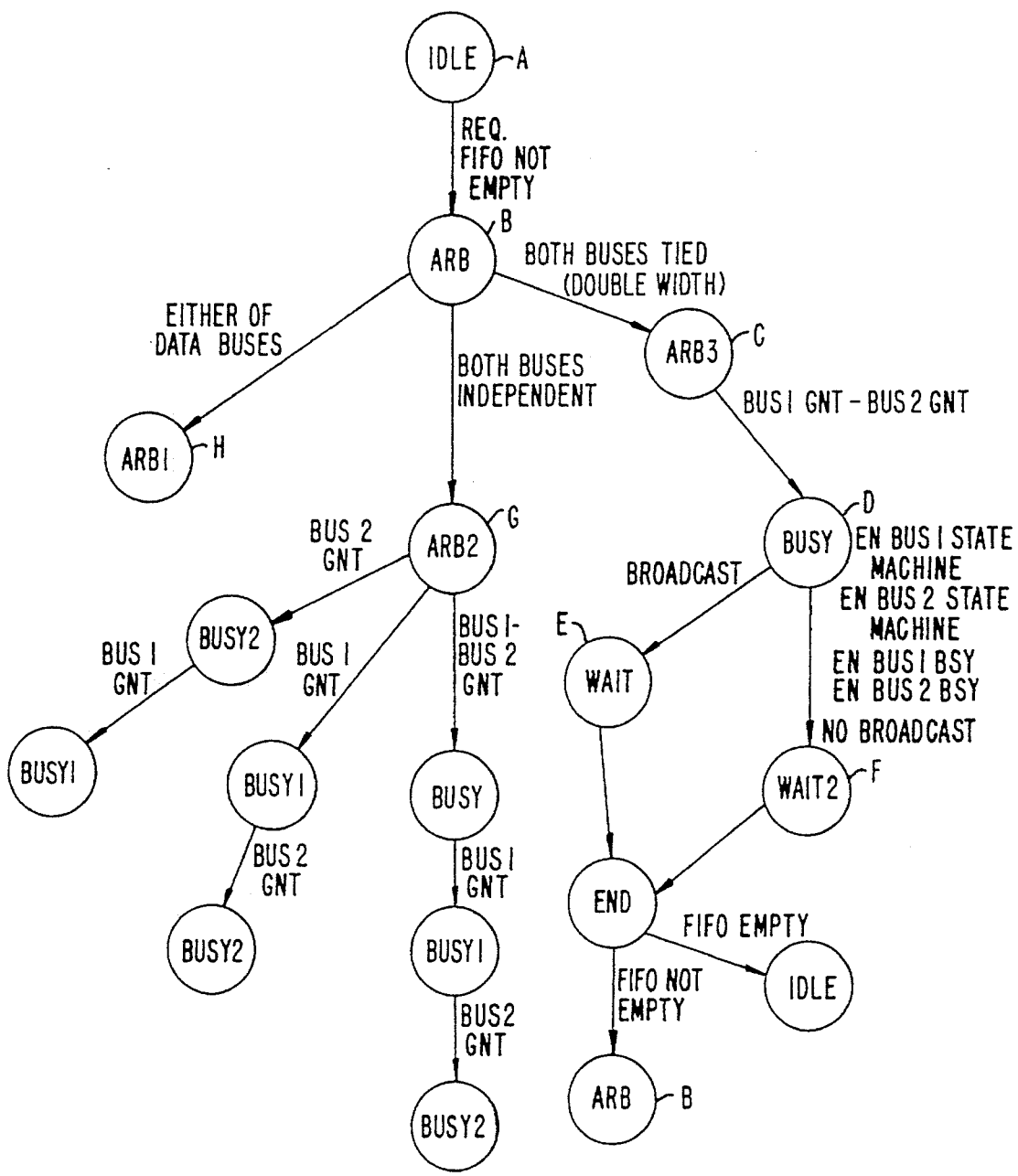
FIGS. 18 and 19 are state diagrams for a block transfer bus interface module sequencer in an interface module of FIG. 1.
Figure 19:
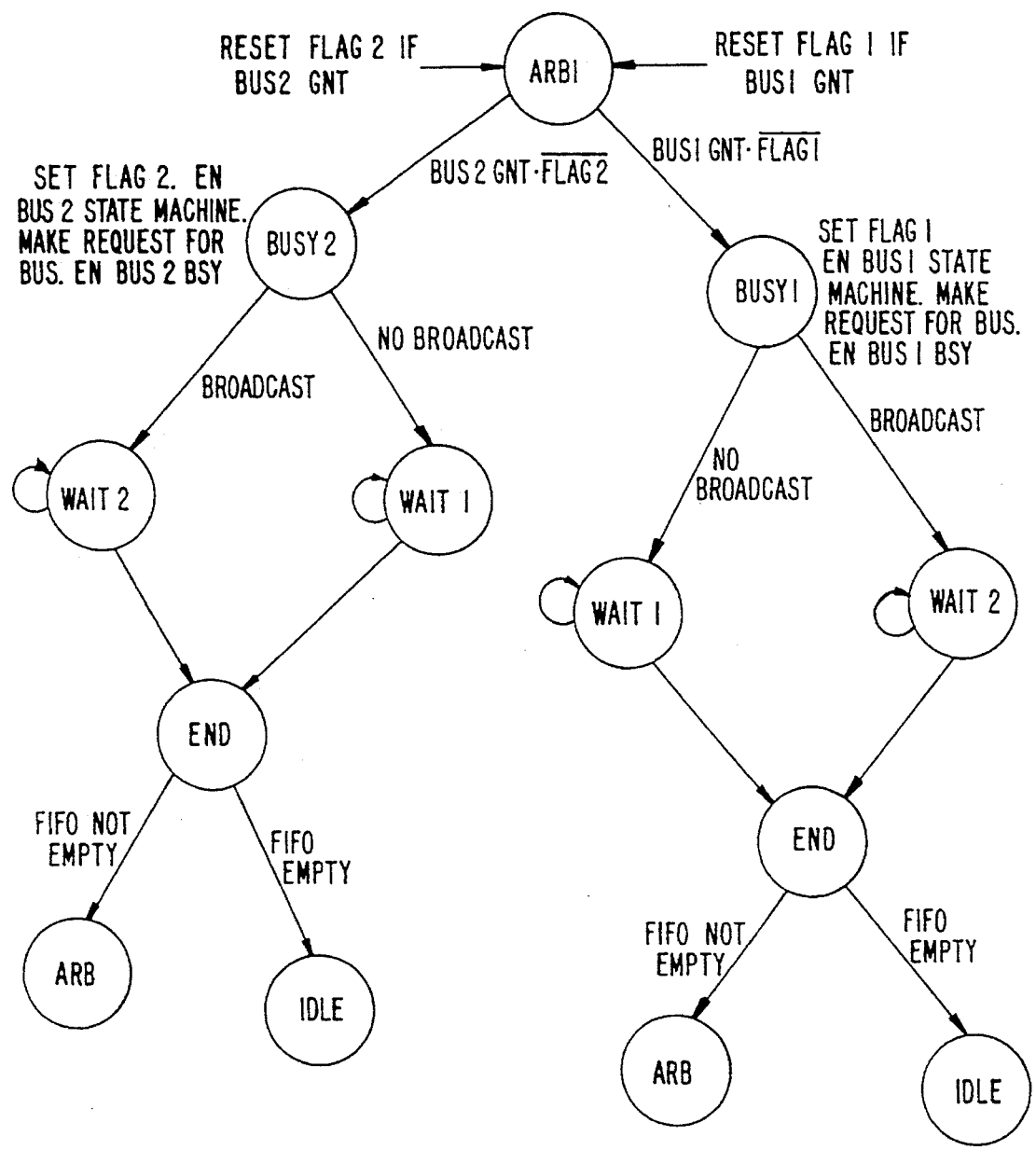

FIG. 18 shows a state diagram for a BTB arbitration sequencer within BTB interface sequencer 120. FIG. 19 shows the details of state ARB1 of FIG. 18. The details of ARB2 and ARB3 are the same.

As shown in FIG. 18, a BTB arbitration sequencer 120 is originally in an idle state A. If it detects that something has been loaded into its request FIFO 28, that means its processor 27 has made a request, and an initial arbitration state B is entered. The request which was transferred to the FIFO is examined, and one of three different arbitration states, ARB1, ARB2, or ARB3, is entered depending upon whether the request is for: (1) either of the data buses, (2) both of the data buses independently, or (3) both of the buses tied together in double-word format.

In the ARB3 state (state C), after the request signal is transmitted to arbiter 24 and both buses are granted by arbiter 24, the sequencer moves to a busy state (state D). In this busy state, the bus 1 and bus 2 busy lines 136 are enabled. Depending upon whether a broadcast mode is requested, either a first wait period (state E) or a second wait period (state F) is entered. At the conclusion of the wait states, the state machine goes back into an idle if the request FIFO 28 is empty, otherwise reenters state B.

For the ARB2 state G, three different paths can be taken in the sequencer state machine depending upon which bus half is available first or if both bus halves are available at the same time. The corresponding busy signals are asserted as shown.

The ARB1 state H is shown in detail in FIG. 19, and is similar to the path for ARB3 (state C) except that two separate paths are provided, depending upon which bus is available first and is granted.

As will be understood by those familiar with the art, the present invention may be embodied in other specific forms without departing from the spirit or essential characteristics thereof. For example, the arbitration could by done by other than a round-robin scheme, or priority levels could be used. Accordingly, the disclosure of the preferred embodiment of the invention is intended to be illustrative, but not limiting, of the scope of the invention which is set forth in the following claims.

What is claimed is:

1. A data transfer system for transferring data to and from an array of disk drives, comprising:

an external computer interface;

a plurality of disk drive interfaces;

a block transfer bus for transferring blocks of data and having a first half and a second half;

each of said computer interface and said plurality of disk drive interfaces including an element for sending, or receiving data, said element being coupled to said block transfer bus including said first half and said second half, each element including means for transmitting a request for access to one of said first half and said second half or both of said first half and said second half and means for transmitting or receiving data over one of said first half and said second half or both of said first half and said second half;

master arbiter means coupled to said block transfer bus separately from said computer interface and said plurality of disk drive interfaces, for receiving said request for access and transmitting an access grant signal to said element for permitting access to one of said first half and said second half or both of said first half and said second half;

a multiple line bus request bus coupled between each of said plurality of disk drive interfaces and said master arbiter means; and a plurality of bus grant lines, each of said bus grant lines being coupled between said master arbiter means and one of said plurality of disk drive interfaces.

2. A data transfer system for transferring data to and from an array of disk drives, comprising:

an external computer interface;

a plurality of disk drive interfaces;

a block transfer bus for transferring blocks of data and having a first half and a second half;

each of said computer interface and said plurality of disk drive interfaces including an element for sending, or receiving data, said element being coupled to said block transfer bus including said first half and said second half, each element including means for transmitting a request for access to one of said first half and said second half or both of said first half and said second half and means for transmitting or receiving data over one of said first half and said second half or both of said first half and said second half;

master arbiter means coupled to said block transfer bus separately from said computer interface and said plurality of disk drive interfaces, for receiving said request for access and transmitting an access grant signal to said element for permitting access to one of said first half and said second half or both of said first half and said second half;

said block transfer bus having an arbitration bus, a first control bus and a second control bus, and a first address/data bus and a second address/data bus;

each of said external computer interface and said plurality of disk drive interfaces having a state machine, a request memory and a status memory;

said state machine having request outputs and a first request grant input and a second request grant input coupled to said arbitration bus, respectively, and said state machine being connected to said first control bus and said second control bus;

said request memory having an output coupled to said first address/data bus and said second address/data bus; and said status memory having an input coupled to said first address/data bus and said second address/data bus.

* * * * *

UNITED STATES PATENT AND TRADEMARK OFFICE
CERTIFICATE OF CORRECTION

PATENT NO. : 5,461,723

DATED : October 24, 1995

INVENTOR(S) : Kaushik S. Shah et al.

It is certified that error appears in the above-identified patent and that said Letters Patent is hereby corrected as shown below: On the title page:

Item: [73] Assignee: MTI Technology Corp., Anaheim, Calif.

Signed and Sealed this

Twenty-sixth Day of March, 1996

Attest:

BRUCE LEHMAN

*Attesting Officer*      *Commissioner of Patents and Trademarks*